United States Patent

Liebert et al.

[11] 4,258,752
[45] Mar. 31, 1981

[54] CONTROL VALVE WITH TWO ROTARY VALVE ELEMENTS SUPPORTED IN A HOUSING AND ACTED UPON AXIALLY BY PRESSURE

[75] Inventors: Karl-Heinz Liebert, Schwabisch Gmund; Werner Tischer, Bobingen, both of Fed. Rep. of Germany

[73] Assignee: Zahnradfabrik Friedrichshafen, AG., Friedrichshafen, Fed. Rep. of Germany

[21] Appl. No.: 79,838

[22] Filed: Sep. 28, 1979

[30] Foreign Application Priority Data

Sep. 30, 1978 [DE] Fed. Rep. of Germany ....... 2842735

[51] Int. Cl.³ .......................... F15B 9/08; F16C 19/54
[52] U.S. Cl. ............................... 137/625.21; 308/135; 91/375 R
[58] Field of Search .................... 137/625.21, 625.23; 91/375 R, 375 A; 308/135, 219, 164

[56] References Cited

U.S. PATENT DOCUMENTS 2,917,079  12/1959  Verbrugge .
3,295,979  3/1946  Tucker ................................. 91/375

*Primary Examiner*—Alan Cohan
*Attorney, Agent, or Firm*—Zalkind & Shuster

[57] ABSTRACT

The axial thrusts applied to two rotatable slide valve elements of a steering control valve assembly, are transmitted independently of each other through radially overlapping, anti-friction bearings to a common axial thrust absorbing surface. A thrust transmitting spacer positioned radially inwardly of one of the anti-friction bearings, extends axially between the other of the anti-friction bearings and the thrust absorbing surface.

6 Claims, 1 Drawing Figure

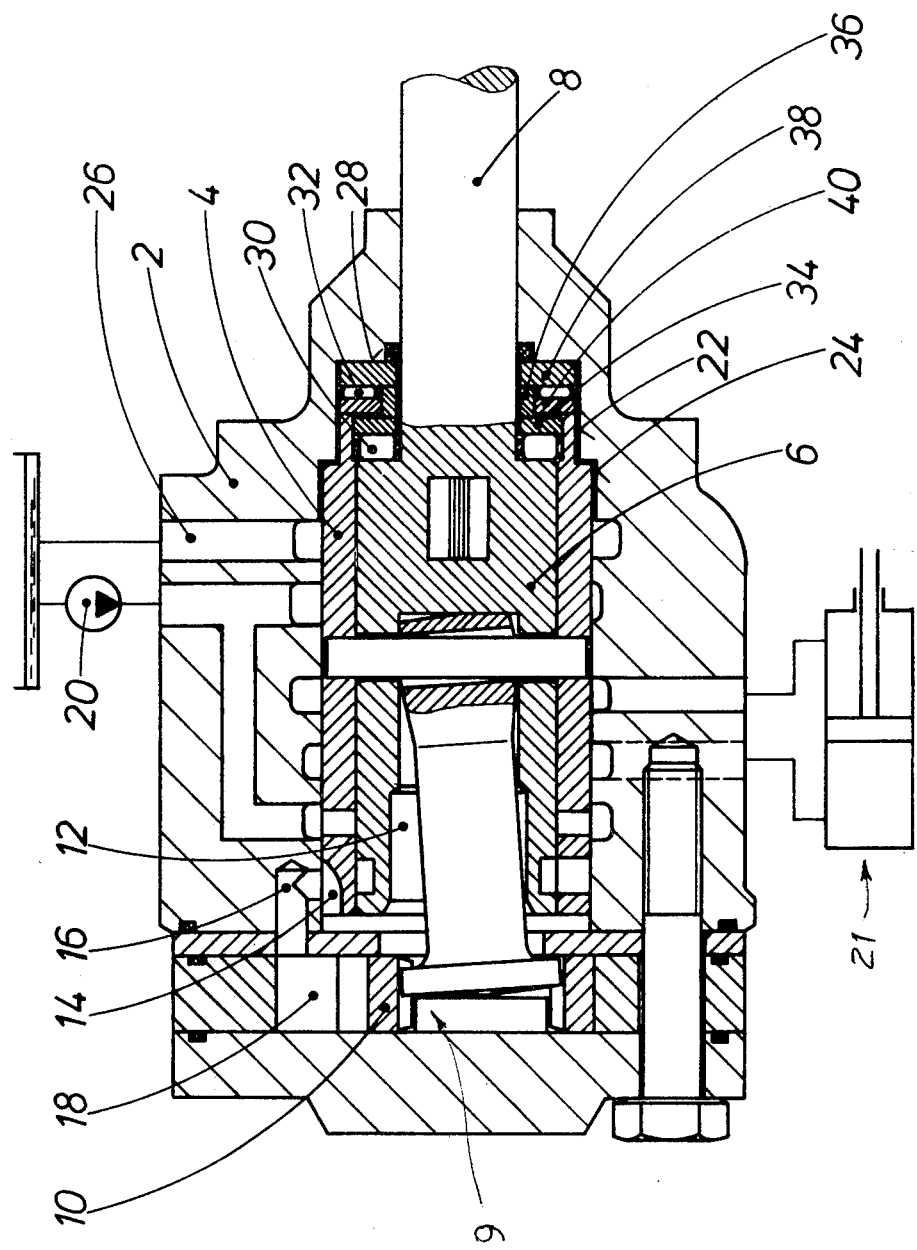

CONTROL VALVE WITH TWO ROTARY VALVE ELEMENTS SUPPORTED IN A HOUSING AND ACTED UPON AXIALLY BY PRESSURE

BACKGROUND OF THE INVENTION

This invention relates to a control valve of the type utilized in a hydrostatic steering system.

Control valves of the foregoing type having two relatively rotatable slide valve elements that are axially biased in one direction by fluid pressure, are well known. In such control valves, the radially outer one of the two slide valve elements is torsionally connected to the rotor of a metering hand pump while the radially inner valve element is connected to a steering spindle. The internal space of the inner slide valve element and the axial ends of the two slide valve elements facing the metering hand pump, are acted upon by the pressure fluid of a pressure source. The opposite axial ends of the slide valve elements, face an abutment in the housing and are free of axial pressure. Consequently, a substantial axial force acts on the two slide valve elements tending to displace the valve elements toward the housing abutment.

In prior control valve assemblies, the two slide valve elements are provided with an axial thrust bearing on the housing abutment in the form of an annular disk to reduce high frictional resistance to rotation of the slide valve elements. Such bearing support for the valve elements while inadequate, is apparently tolerated because of the difficulties in providing an anti-friction type of bearing with a relatively small diameter. Anti-friction bearings capable of sustaining the required loading are not available for such small diameter installations. Any enlargement of the bearing diameters cannot be tolerated because the generated surface of both slide elements that determine the bearing diameters, are sealing surfaces. Any enlargement of such sealing surfaces, even in the order of 5 mm, would result in substantial fluid leakage.

It is therefore an important object of the present invention to provide anti-friction bearings for both rotatable slide valve elements of a hydrostatic steering control valve assembly for the absorption of axial thrust loads without diametrical enlargement of the sealing surfaces of the slide valve elements.

SUMMARY OF THE INVENTION

In accordance with the present invention, a steering control valve assembly is provided with two axial, anti-friction bearings which radially overlap each other. One of the anti-friction bearings is in engagement with only the radially inner one of the slide valve elements. Two radially overlapping annular disks are positioned axially between the two anti-friction bearings, with one of said disks in engagement with the radially outer slide valve element so that the two disks respectively transmit axial thrusts, applied to the slide valve elements, independently of each other.

An important aspect of the invention resides in the use of the two anti-friction bearings which are mutually independent because of radial overlap and wherein more than half of the radial supporting surfaces of the bearings are available for transfer of forces between the two rotatable slide valve elements and the housing abutment through radially overlapping and axially loaded annular disks. In this manner, axial thrust is absorbed by conventional anti-friction bearings of the axial thrust type to avoid the frictional resistance heretofore tolerated in prior art installations.

BRIEF DESCRIPTION OF DRAWING FIGURE

An embodiment of the invention is hereinafter described with reference to the accompanying drawing, illustrating a longitudinal section view through a steering control valve assembly for a hydrostatic fluid power steering system.

DETAILED DESCRIPTION OF PREFERRED EMBODIMENT

Referring now to the drawing in detail, a control valve assembly is shown for controlling the supply of pressurized fluid from a pump 20 to a fluid servomotor 21 in a hydrostatic steering system. The control valve assembly includes a radially outer slide valve element 4 rotatably supported in a bore of a valve body or housing 2, and a radially inner slide valve element 6 rotatable within a bore of said element 4. The element 6 is formed integrally with a valve operating, steering spindle 8. The outer slide valve element 4 is torsionally connected with a rotor 10 of a hand metering pump 9 of generally well known construction. A space 12 is enclosed within the inner slide valve element, extending axially from the inner axial ends of both slide valve elements exposed to the pressure prevailing in fluid displacing pockets 18 of the hand metering pump through passages 14 and 16. The pressure exerted on the valve elements is the full or almost full pressure of the high pressure pump 20 and may assume values up to 180 bar.

The axial ends of the two slide valve elements on the right side as viewed in the drawing, are relieved of pressure by annular gaps 22 and 24 and a return line 26 to a fluid reservoir 19 from which fluid is drawn by the pump 20. Consequently, the full force resulting from the pressure exerted on the left-hand inner axial ends of both slide valve elements must be absorbed by an abutment 28 on the right-hand end of the housing 2 as shown in the drawing. For this reason, two separate anti-friction, axial thrust bearings 30 and 32 have been provided. The bearing 30 engages the right axial end surface of the inner slide valve element 6 and is supported on an annular disk 34. The annular disk 34 is backed by an annular spacer 36 surrounding the steering spindle 8. An annular disk 38 is positioned between the spacer 36 and the abutment 28 of the housing about the steering spindle. Thus, axial thrust is transmitted to the abutment surface 28 from the inner valve element 6 through the anit-friction bearing 30, the bearing support disk 34, the annular spacer 36 and a common thrust receiving annular disk 38.

The radially outer slide valve element 4 is positioned in radially overlapping relationship to the anti-friction bearing 32 and is supported on an annular disk 40 in engagement with the axial end surface of the slide valve element 4. The disk 40 serves as a raceway for the bearing 32 while the other raceway for this bearing is formed by the annular disk 38 in engagement with the abutment surface 28. The two annular disks 34 and 40 as well as the anti-friction bearings 30 and 32 with which they are associated, overlap radially. The annular disk 38 serves both as a raceway for the bearing 32 and to axially position the spacer 36 and bearing 30 engaged with the slide valve element 6. The axial thrust applied to the outer slide valve element 4 is transmitted to the abutment 28 through the bearing 32 and the disk 40 associated therewith, independently of the axial thrust transmitted from the inner valve element 6, because of the spacer 36 isolating the axial thrust transmitted through the bearing 30 from that through bearing 32. Because of the radially overlapping relationship between the bearings, bearings of larger diameters may be utilized capable of sustaining the axial thrust loads prevailing in the type of assembly described.

What is claimed is:

1. In a control valve for a hydrostatic steering system or the like having a housing (2) and two slide valve elements (4, 6) rotatable relative to each other and the housing, and wherein said slide valve elements are axially biased by pressure toward an abutment (28) in the housing, the improvement residing in axial thrust transmitting means including: two axial anti-friction bearings (30, 32) radially overlapping each other, one of the bearings (30) being engaged by one of the slide valve elements (6), and two annular disks (34, 40) radially overlapping each other and axially positioned between the abutment and said one of the slide valve elements transmitting axial thrusts independently of each other.

2. The control valve as defined in claim 1, wherein one of the annular disks (40) is engageable by a radially outer one of the slide valve elements (4) and projects radially inward therefrom to transmit axial thrust to the abutment of the housing through the other of the bearings (32), and a spacer (36) engaged with the other of the annular disks (34) radially within said one of the annular disks (40) to transmit axial thrust from the radially inner one of the slide valve elements (6) to the abutment of the housing.

3. The control valve as defined in claim 2 including an additional annular disk (38) in engagement with the abutment of the housing acting as a raceway of the other of the bearings (32) and to transmit axial thrust from said one of the slide valve elements (6) through the spacer to the abutment.

4. The control valve as defined in claim 1 including an additional annular disk (38) in engagement with the abutment of the housing acting as a raceway for the other of the bearings (32) and to transmit axial thrust from said one of the slide valve elements (8) to the abutment.

5. For used with a control valve assembly including a housing (2) and two rotatable slide valve elements (4, 6) exposed to axial thrusts absorbed by a common abutment surface (28) of the housing, an axial thrust bearing assembly comprising a pair of anti-friction bearing devices (30, 32) axially positioned between the valve elements and the abutment surface in radially overlapping relationship to each other for respectively transmitting the axial thrusts from the two valve elements to the abutment surface, and spacer means (36) in operative engagement with one of anti-friction bearing devices (30) for effecting said transmission of the axial thrusts independently of each other.

6. The axial thrust bearing assembly as defined in claim 5 further including a pair of radially overlapping annular disks (34, 40) respectively associated with said bearing devices, one of said disks (40) being in axial engagement with a radially outer one of the valve elements (4), the spacer means being disposed radially inward of said one of the disks and in axial engagement with the other of the disks (34).

* * * * *